United States Patent
Xu et al.

(10) Patent No.: US 8,515,292 B2
(45) Date of Patent: Aug. 20, 2013

(54) OPTIMIZED NORMALIZED LEAST MEAN SQUARE PHASE ESTIMATION

(75) Inventors: Lei Xu, Princeton Junction, NJ (US);
Shaoling Zhang, Anhui Province (CN);
Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 270 days.

(21) Appl. No.: 12/938,738

(22) Filed: Nov. 3, 2010

(65) Prior Publication Data

US 2012/0106983 A1    May 3, 2012

(51) Int. Cl.
*H04B 10/06* (2011.01)
*H04B 10/00* (2006.01)

(52) U.S. Cl.
USPC ............ 398/208; 398/202; 398/203; 398/205

(58) Field of Classification Search
USPC .................................................. 398/202–214
See application file for complete search history.

(56) References Cited

U.S. PATENT DOCUMENTS 5,727,073 A * 3/1998 Ikeda ........................... 381/94.7

OTHER PUBLICATIONS

Mori et al., "Unrepeated 200-km transmission of 40-Gbit/s 16-QAM signals using digital coherent receiver", Feb. 2, 2009, Optics Express, vol. 17, No. 3, pp. 1435-1441.*
Mori, Y. et al., "Unrepeated 200-km transmission of 40-Gbit/s 16-QAM signals using digital coherent receiver", Feb. 2, 2009, vol. 17, No. 3, Optics Express, pp. 1435-1441.

* cited by examiner

*Primary Examiner* — Danny W Leung
*Assistant Examiner* — Daniel Dobson
(74) *Attorney, Agent, or Firm* — Joseph Kolodka

(57) ABSTRACT

Methods and systems for normalized least mean square phase estimation are shown that include receiving optical transmissions that include a modulated signal, determining a step size based on a signal-to-noise ratio (SNR) and a laser linewidth that provides a balance between convergence speed and precision, estimating phase error using the determined step size, derotating the modulated signal to remove the estimated phase error, and demodulating the derotated signal to produce a bitstream.

17 Claims, 7 Drawing Sheets

(a) (b) (c)

OPTIMIZED NORMALIZED LEAST MEAN SQUARE PHASE ESTIMATION

BACKGROUND

Technical Field

The present invention relates to coherent optical detection and, in particular, to optimized normalized least mean square phase estimation in digital coherent receivers.

Description of the Related Art

Coherent detection attracts intensive research because demodulation schemes based in coherent detection can offer high spectral efficiency and high capacity to optical networks, allowing them to meet the demanding bandwidth requirements for exponentially-growing network traffic. In contrast to early coherent detection schemes, current coherent detection resorts to high-speed analog-to-digital converters to sample the detected photocurrents and performs digital signal processing (DSP) algorithms to compensate for transmission impairments and improve system performance. Such digital coherent receivers avoid using costly and complicated optical phase-locked loops, thereby simplifying the structure of optical receivers.

One step in coherent detection is phase estimation. Many coherent detection systems perform phase estimation using discrete step sizes to home in on an accurate value. However, due to changing signal-to-noise ratios, the optimum step size is not constant. These systems therefore suffer from inefficiencies as a result of using suboptimal step sizes.

SUMMARY

A method is shown that includes receiving optical transmissions that include a modulated signal, determining a step size based on a signal-to-noise ratio (SNR) and a laser linewidth that provides a balance between convergence speed and precision, estimating phase error using the determined step size, derotating the modulated signal to remove the estimated phase error, and demodulating the derotated signal to produce a bitstream.

A receiver is shown that includes a detection module configured to estimate the phase error of incoming signals and detect data symbols within an optical beam and a demodulator configured to extract a bitstream from the data symbols. The detection module further includes a step size computing module configured to determine a step size based on laser phase variance and signal-to-noise ratio (SNR) that provides a balance between convergence speed and precision and a derotator module configured to determine a rotation coefficient using normalized least-mean square and the determined step size and to derotate the incoming signals to compensate for phase error.

A detection module is shown that includes a rotation coefficient module configured to generate a rotation coefficient based on a step size, the complex conjugate of a received signal, and an error signal that represents the difference between a previous received signal and a previous determined symbol; a rotator configured to rotate a received signal using the rotation coefficient o produce a rotated signal; a decision module configured to determine a symbol from the rotated signal; a combiner configured to find the difference between the rotated signal and the determined symbol, producing an error signal; and a step size computing module configured to determine a step size based on present conditions that provides a balance between convergence speed and precision.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
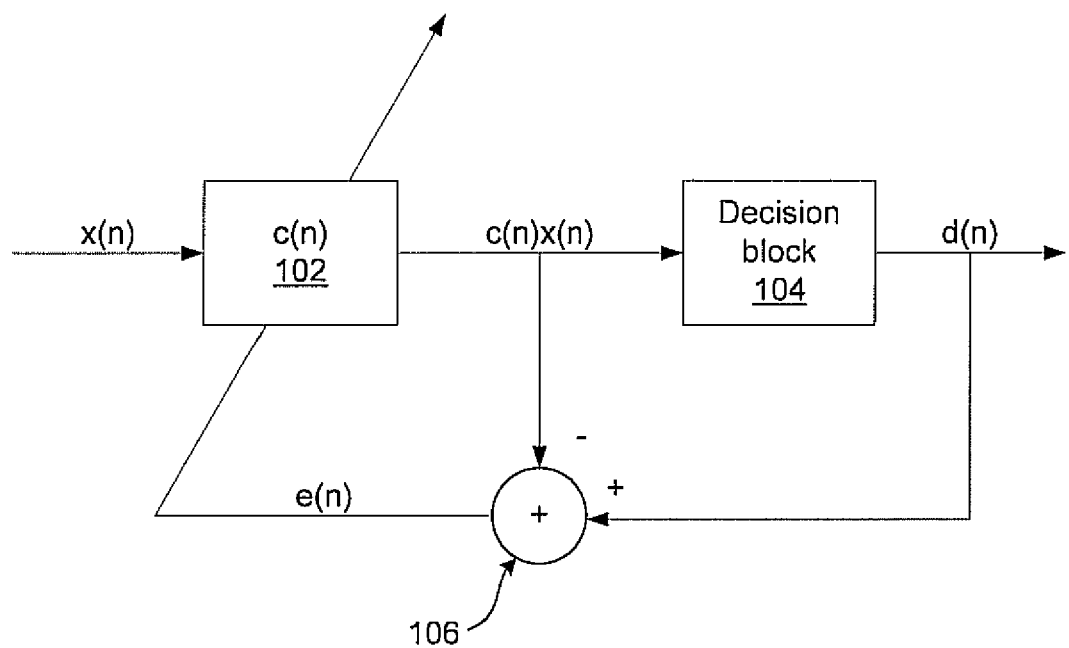
FIG. 1 is a block diagram of decision-directed carrier-phase estimation.

The use of multilevel modulation formats is one of the most effective ways of enhancing the spectral efficiency of optical fiber communication systems. Among various modulation formats, M-ary phase shift keying (PSK), such as quadrature PSK and 8-PSK, has been extensively studied in conjunction with the digital coherent optical receiver, which enables restoration of the in-phase and quadrature components of the optical complex amplitude. However, as far as the PSK format is employed, further increase in the level of modulation becomes difficult, because the distance between symbols on the complex plane is too short to maintain good bit-error rate (BER) performance.

On the other hand, quadrature amplitude modulation (QAM), where both of the in-phase and quadrature components are modulated in a multilevel manner, may be employed for a spectrally efficient modulation format because the power penalty due to modulation level increases can be minimized.

To demodulate such QAM signals, it is useful to estimate the phase fluctuation of input signals. Such fluctuations stem from the semiconductor lasers used in the transmitter and the local oscillator (LO) and can disrupt communications by causing misdetection of QAM symbols. These transmission errors limit the maximum speed of transmission.

Although carrier-phase estimation methods may calculate the $4^{th}$ power of the complex amplitude of the QAM signal, such processes use complicated amplitude discrimination before carrier-phase estimation, driving up the complexity and cost of the receiver unit. In contrast, the present principles advantageously introduce the much simpler decision-directed carrier-phase estimation, which is based on least-mean square (LMS) methods. This allows for substantial reductions in the cost and complexity of receiver mechanisms.

Among DSP methods, phase estimation (PE) is used in digital coherent receivers for purposes such as the selection of the laser's linewidth and receiver sensitivity penalty. A normalized least-mean square (NLMS) method may adaptively recover the carrier phase, but existing techniques manually adjust the stepsize $\mu (0<\mu \leq 1)$ of the NLMS PE. In contrast, the present principles analytically examine the phase error variance of the NLMS and derive an approach to adaptively adjust the stepsize μ depending on system parameters such as signal-to-noise ratio (SNR) and phase noise variance. In this way, an optimal step size can be selected at any time. By analytically generating the optimal step size, the best balance between speed of convergence and precise error compensation can be achieved.

Embodiments described herein may be entirely hardware, entirely software or including both hardware and software elements. In a preferred embodiment, the present invention is implemented in software, which includes but is not limited to firmware, resident software, microcode, etc. In particular, the present principles may be employed in optical receivers that use coherent detection.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block diagram of decision-directed carrier-phase estimation is shown. A received signal x(n) is the digitized complex amplitude detected by a homodyne phase-diversity receiver, where n denotes a position within a received sequence. NMLS estimation is given by:

$$c(n+1) = c(n) + \frac{\mu}{|x(n)|^2} e(n) x^*(n), \quad (1)$$

$$e(n) = d(n) - c(n)x(n). \quad (2)$$

where d(n) is the decoded symbol, e(n) represents the estimation error defined as the difference between the rotated complex amplitude and the decoded symbol, and μ is a step size parameter. In these equations, * represents the complex conjugate operator, such that c(n+1) is based on the complex conjugate of the input signal. Block 102 performs equation (1) and rotates the input signal x(n) to produce c(n)x(n). Combiner 106 performs equation (2) using the output of block 102 and decision block 104, feeding back the e(n) signal to block 102. Decision block 104 uses the rotated signal c(n)x(n) to produce a the decoded symbol d(n). In accordance with equations (1) and (2), c(n) is updated in a symbol-by-symbol fashion so that e(n) approaches zero.

It can clearly be seen from equation (1) that an increased stepsize p will produce proportionally larger changes from one symbol to the next, leading to a faster convergence toward a null e(n). However, if the step size is too large it will overshoot and oscillate around the optimal correction. A smaller step size is able to take c(n) closer to the optimal correction, but may be too slow in reaching that value if the error changes too drastically. As such, it is helpful to adapt the stepsize μ to the present conditions. Selection of stepsize from a preordained set, such as is used in other coherent detection systems, will be limited to certain discrete options and will therefore provide suboptimal results.

Figure 2:
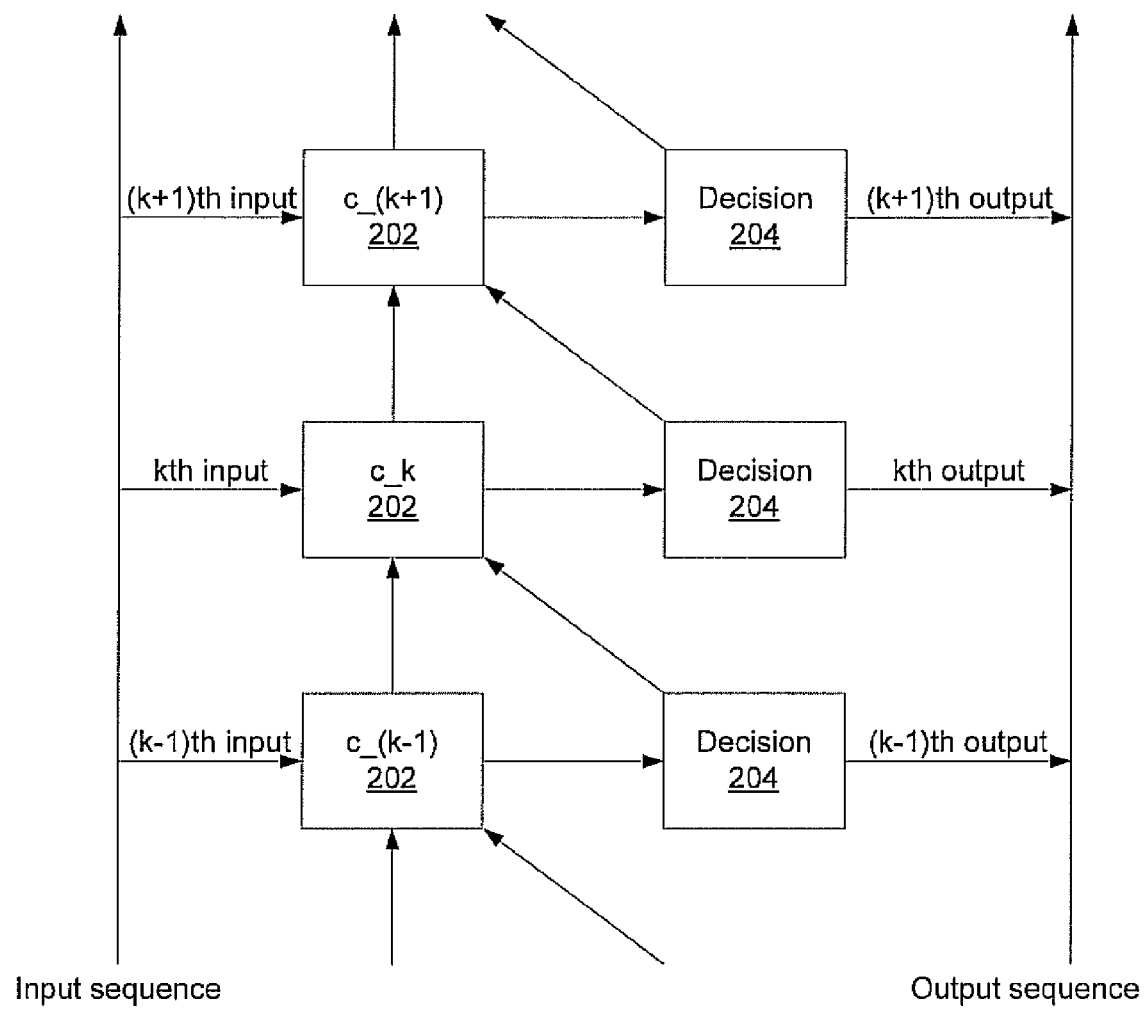
FIG. 2 is a diagram of a computational framework for decision-directed phase estimation.

Referring now to FIG. 2, a computational framework is shown for decision-directed PE. Each c block 202 includes the LMS-based calculations given by equations 1 and 2. Each step k in the sequence arrives at a respective c block 202 and produces a rotated input value which decision block 204 uses to produce an output symbol. The rotated input and decoded symbol from each step k are passed to the c block for step (k+1) to be used in rotating the next input symbol. This feed-forward scheme is easier to implement than a $4^{th}$ power PE method and can be implemented in parallel processing, allowing for substantial gains in efficiency with modern processing techniques. In contrast, $4^{th}$ power PE for 16-QAM uses three-level amplitude discrimination before conducting PE, which substantially increases computation complexity. As complexity translates roughly to cost of implementation, the present principles allow for a reduction in the cost of producing phase estimation components while the use of an optimal stepsize gets the greatest performance out of the NMLS method.

Selecting a step size parameter μ is an important part of performing PE according to the present principles. When μ<<1, current updates of the tap coefficient are influenced by preceding symbols, which improves the signal-to-noise ratio (SNR) of the obtained phase reference. The inverse of μ indicates the effective averaging-span length. However, a long effective averaging-span length makes it difficult to cope with rapid phase changes that might occur, as pre-change values will continue to affect the average long after the change has occurred. As such, it is advantageous to optimize the step size μ depending on the SNR of the received signal and the linewidths of the transmitter laser and the local oscillator.

One way to select μ is to manually select from several stepsize options, such as, e.g., 0.0001, 0.001, 0.01, 0.1, and 1. The performance is measured using the selected stepsize in terms of BER or phase error variance. The stepsize which achieves the best performance is for phase estimation. However, this process may be time-consuming, as every stepsize is tested before selecting the best one. Furthermore, discrete stepsizes may miss the optimal stepsize due to the relatively small number of stepsize candidates available. Increasing the number of options for step size also increases the amount of time needed for testing, creating an undesirable tradeoff between effectiveness of the selected stepsize and the speed of selection.

In an advantageous application of the present principles, the phase error variance of NLMS PE may be analytically derived. This analytical phase error variance clarifies the relationship between the laser phase noise variance, system SNR, and the stepsize μ. The optimal stepsize μ that leads to minimal phase error variance is expressed mathematically in terms of laser phase noise variance and the system's SNR. Therefore, the stepsize of NLMS may be adaptively determined at different SNRs and laser phase noise variances without a time-consuming search process. As conditions change, the stepsize may be immediately updated to reflect the new phase error variance and preserve performance.

Figure 3:
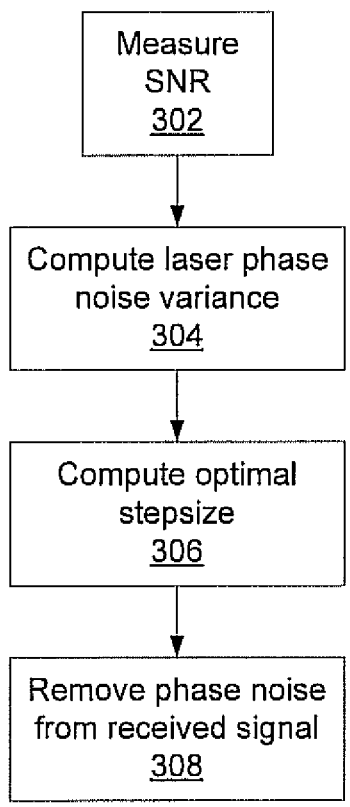
FIG. 3 is a block/flow diagram illustrating a method/system for selecting an optimal stepsize $\mu$.

Referring now to FIG. 3, a block/flow diagram illustrating a method for selecting an optimal stepsize µ is shown. Block 302 measures the SNR γ using, for example, performance monitoring or direct measurements from an optical powermeter. Block 304 then computes the laser phase noise variance $\sigma_p^2$ directly from the laser linewidth and the system symbol rate. Block 306 then: uses these values to calculate the optimal stepsize as $$\mu_{opt} = \rho\left(\sqrt{1 + \frac{2}{\rho}} - 1\right), \quad (3)$$

where $\rho = \sigma_p^2/\sigma_n^2$ and $\sigma_n^2 = 1/\gamma$. The quantity $\rho$ is used to help in comparing the impact of the laser phase noise $\sigma_p^2$ and the system additive noise $\sigma_n^2$. If the ratio is larger than 1, for example, then the system can take into account the fact that the laser phase noise is dominant, such that the stepsize µ may be increased to track the fast-varying noise. Otherwise the stepsize µ will decrease to average out the dominant system noise. In general, $\rho$ is used as an indicator to show which noise is playing a major role in the system.

To remove the noise effect on received signals in block 308, a complex coefficient is used to derotate the signals. At low SNRs, a smaller stepsize µ is preferred to average out more additive noise, whereas the large stepsize µ performs better to track fast-varying phase noise at high SNRs.

Figure 4:
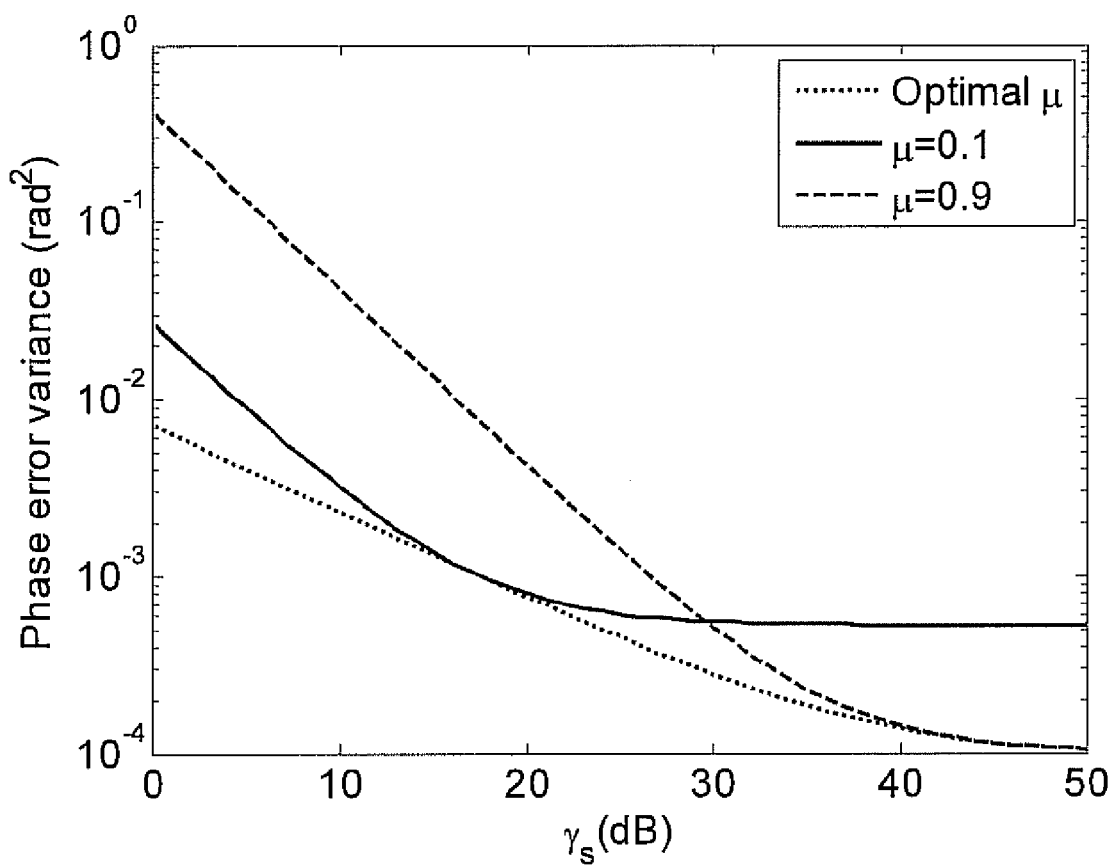
FIG. 4 is a graph of phase variance at different signal-to-noise ratios for an M-ary phase shift keying system.

Referring now to FIG. 4, a graph of phase variance at different SNRs for an M-ary PSK system is shown when using several options for the stepsize µ. The horizontal axis shows SNR in decibels, while the vertical axis shows the phase error variance in square radians. For this graph, laser phase noise variance $\sigma_p^2$ is set to $10^{-4}$ rad$^2$. As can be clearly seen from the graph, fixed step sizes, such as 0.1 or 0.9, are only effective over a very small range of SNRs. However, adaptively selecting a step size allows the selection of the optimal step size for any SNR.

Figure 5:
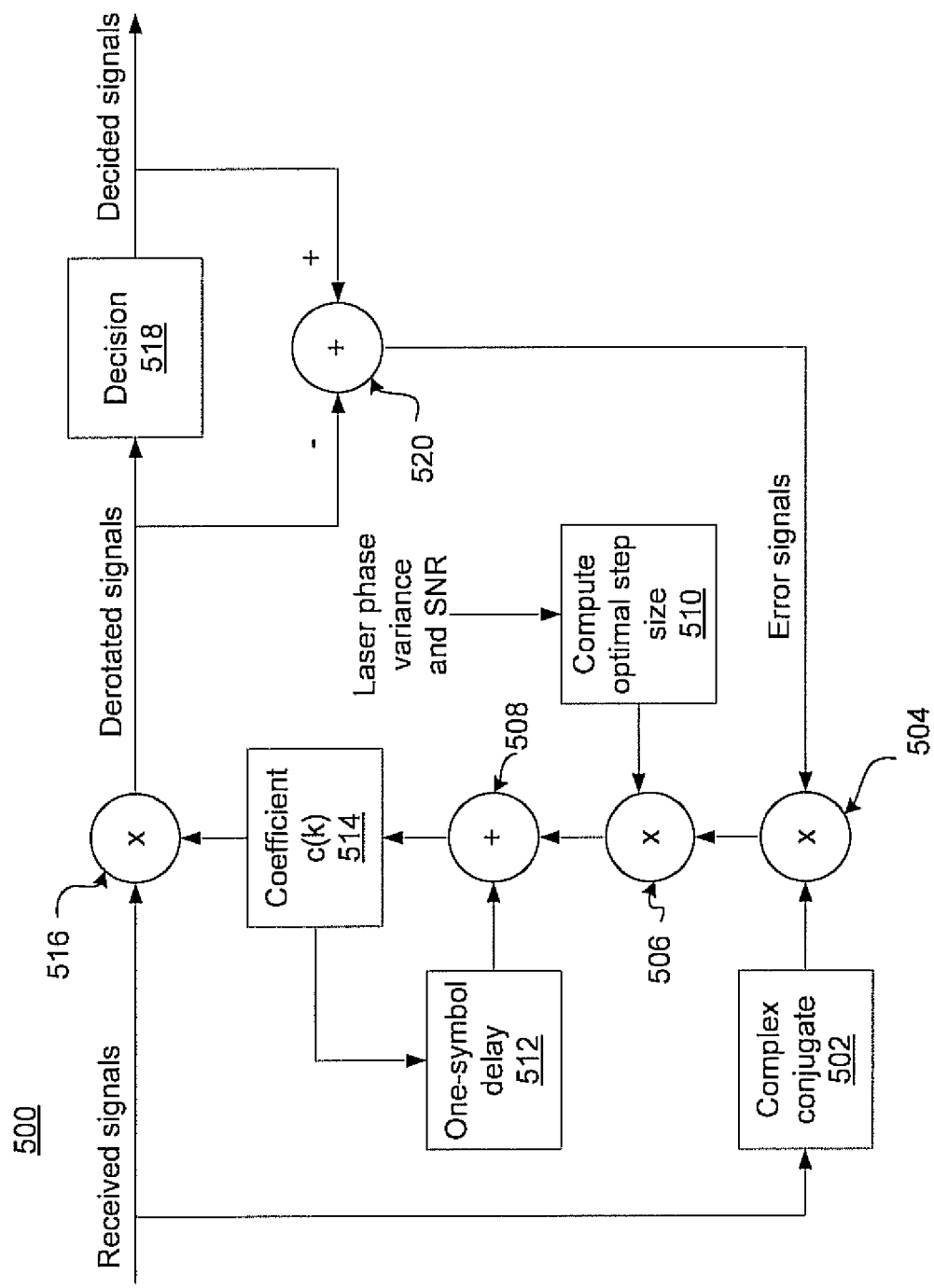
FIG. 5 is a diagram of an NLMS phase estimator with optimal stepsize selection.

Referring now to FIG. 5, an NLMS phase estimator with optimal stepsize. selection is shown as part of phase estimation module 500. The phase estimator may be implemented as hardware, or it may be implemented as a combination of hardware and software within a receiver system. A received signal arrives at multiplier 516, where it is multiplied by the correction coefficient c(k) described above to produce a derotated signal. This derotated signal is then interpreted by decision block 518 to produce data symbols. Combiner 520 takes the difference between the derotated signal and the decided signal, producing an error signal that represents how far the derotated signal was from the decided symbol.

Block 502 produces the complex conjugate of the received signal, and multiplier 504 multiplies this complex conjugate with the error signal. The laser phase variance and SNR are used to compute an optimal step size at block 510, and this optimal step size is multiplied at multiplier 506 with the output of multiplier 504. The output of 506 is then added at combiner 508 to a signal that's delayed by one symbol from block 512. This combined signal is then used in block 514 to produce the coefficient c(k), described above and calculated for example with equations (1) and (2).

Figure 6:
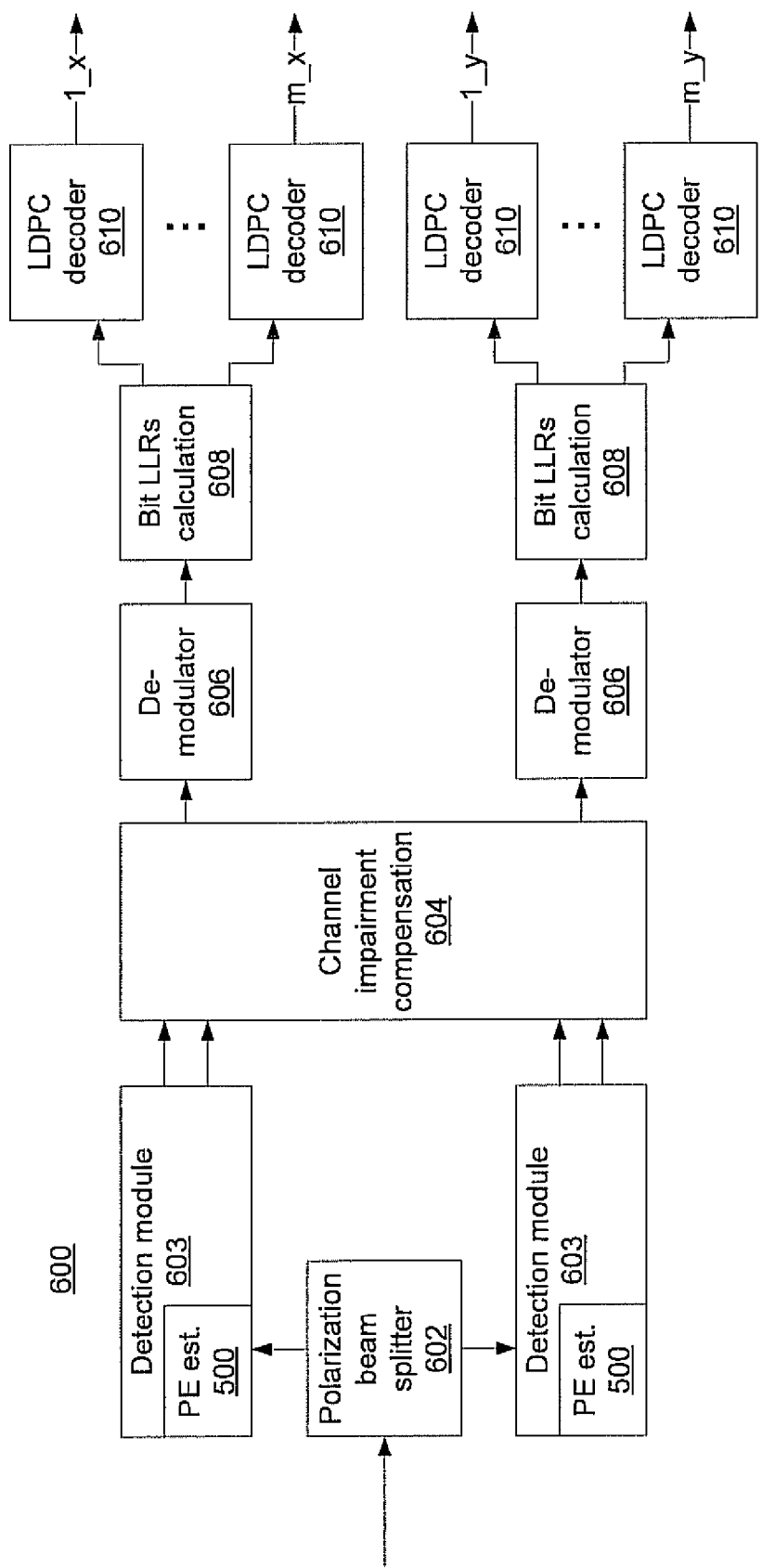
FIG. 6 is a diagram of an optical receiver that employs a detection module according to the present principles.

Referring now to FIG. 6, an optical receiver 600 employing the detection module 500 is shown. The detection module 500 is one part of the optical receiver 600. An optical carrier beam is received and split into orthogonal polarizations using a polarization beam splitter 602. This produces two separate branches, each of which passes to a detection module 603 that extracts symbols from the carrier beam and employs an NLMS phase estimator 500 with optimal stepsize selection. The outputs of the detection module then go to channel impairment compensation module 604, which can use any of a variety of additional techniques in addition to the adaptive equalization described above to remove further channel impairments such as polarization mode dispersion, chromatic dispersion, and inter-symbol interference. Exemplary types of compensation that may be employed include, for example, turbo equalization and digital backpropagation.

The data streams produced by channel impairment compensation module 604 is de-modulated by de-modulators 606 to produce bitstreams. The de-modulators 606 employ a constellation look-up table to convert an input symbol into a sequence of bits. Although it is contemplated that any modulation scheme may be employed with the present principles, 16-QAM is described herein for illustrative purposes. Data is frequently encoded using some form of forward error correction, to ensure proper transmission. One exemplary form of encoding is using low-density parity check (LDPC) codes, which allow for transmission close to the Shannon limit. Although it is contemplated that any other form of encoding could be used according to the present principles, LDPC codes are used herein for the sake of example. The bitstreams are processed by bit LLR calculation modules 608, which produce the LLR information that is used to decode the LDPC codes, and sent to one or more LDPC decoders 610. The LDPC codes apply forward error correction to the bitstreams to account for any errors during transmission that were not compensated for in block 604 and produce a set of output data streams.

Figure 7:
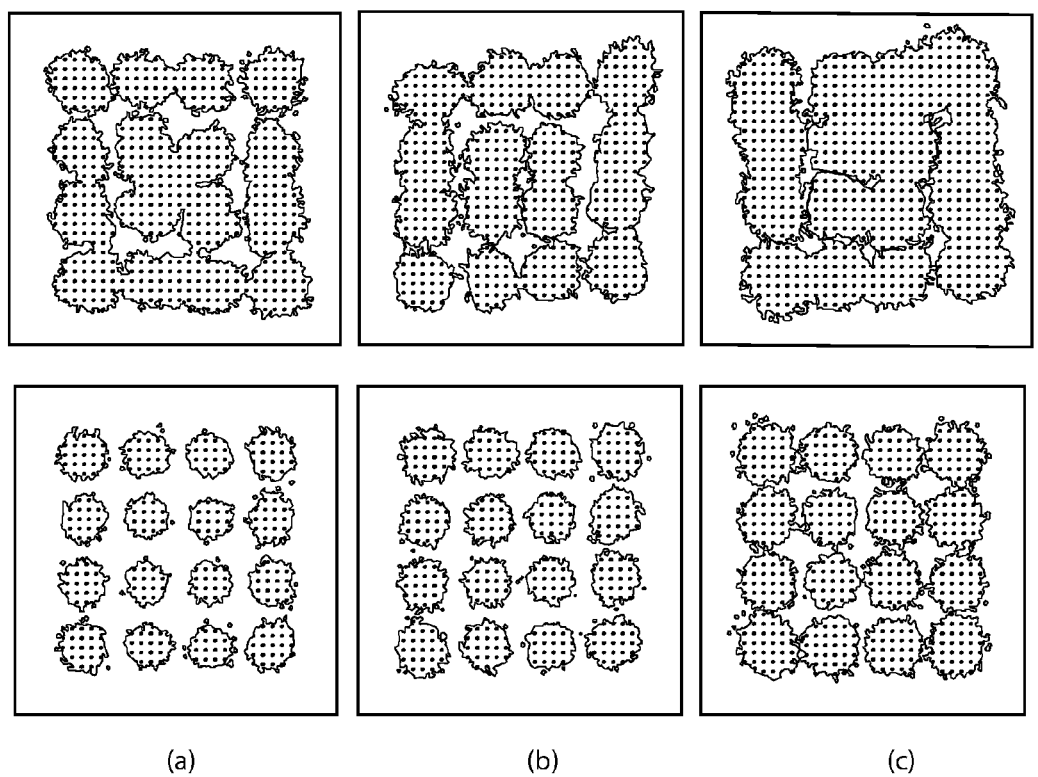
FIG. 7 is a diagram of 40-Gbit/s 16-QAM constellation maps before and after equalization.

Referring now to FIG. 7, constellation maps of 40-Gbit/s 16-QAM signals are shown before and after adaptive equalization. FIG. 7a shows back-to-back transmission (i.e., zero meters), FIG. 7b shows constellation maps at 100 km, and FIG. 7c shows constellation maps at 200 km. The received average power is −30 dBm in every case. From FIG. 7a, distortion of symbol alignment due to imperfect modulation is improved dramatically by adaptive equalization. After transmission over 100 km, where the launched power was set to zero dBm, although the fixed equalizer compensates for group velocity dispersion (GVD), the effect of residual GVD has degraded the constellation map compared with the back-to-back one. From FIG. 7c it can be observed that the distortion of symbol alignment begins to appear due to self-phase modulation (SPM) at the launched power of 10 dBm. Note that the phase rotation angle is different among the inner four symbols, middle eight symbols, and outer four symbols. When the launched power is further increased, the distortion becomes more and more serious. Although symbols are realigned with adaptive filtering, SPM-induced inter-symbol interference (ISI) cannot be removed completely by the linear equalizing process, and the distribution of each equalized symbol is broad.

As can be clearly seen from FIG. 7, using optimal stepsize phase estimation provides substantial benefits to symbol detection, preserving symbol boundaries even at 200 km. This is achieved at low complexity and low cost, allowing for the use of low-cost receivers.

Having described preferred embodiments of a system and method for optimized normalized least mean square phase estimation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
receiving optical transmissions that include a modulated signal;
determining a step size based on a signal-to-noise ratio (SNR) and a laser linewidth that provides a balance between convergence speed and precision;
estimating phase error using the determined step size;
derotating the modulated signal to remove the estimated phase error; and
demodulating the derotated signal to produce a bitstream, wherein the stepsize is determined as $$\mu_{opt} = \rho\left(\sqrt{1 + \frac{2}{\rho}} - 1\right),$$

where $\rho = \sigma_p^2/\sigma_n^2$, $\sigma_n^2 = 1/\gamma$, $\gamma$ is the SNR, and $\sigma_p^2$ is the laser phase noise variance.

2. The method of claim 1, wherein the step size is determined analytically and increases as laser phase noise variance and SNR increase.

3. The method of claim 1, wherein said estimating and derotating are performed in a cascaded fashion, using results from estimation and derotation of previous signals to estimate and derotate a current signal.

4. The method of claim 1, further comprising updating the step size if the SNR or laser phase error variance change.

5. The method of claim 1, wherein estimating phase error includes using normalized least-mean square with the determined step size.

6. The method of claim 1, wherein derotating multiplies the modulated signal by a coefficient $$c(n+1) = c(n) + \frac{\mu}{|x(n)|^2} e(n)x^*(n),$$

where c(n) is the previous coefficient, $\mu$ is the step size, x(n) is the received signal, e(n) is the estimation error defined as the difference between the rotated complex amplitude and the decoded symbol, and x*(n) is the complex conjugate of the received signal.

7. A receiver, comprising:
a detection module configured to estimate the phase error of incoming signals and detect data symbols within an optical beam comprising:
a step size computing module configured to determine a step size based on laser phase variance and signal-to-noise ratio (SNR) that provides a balance between convergence speed and precision; and
a derotator module configured to determine a rotation coefficient using normalized least-mean square and the determined step size and to derotate the incoming signals to compensate for phase error; and
a demodulator configured to extract a bitstream from the data symbols,
wherein the stepsize is determined as $$\mu_{opt} = \rho\left(\sqrt{1 + \frac{2}{\rho}} - 1\right),$$

where $\rho = \sigma_p^2/\sigma_n^2$, $\sigma_n^2 = 1/\gamma$, $\gamma$ is the SNR, and $\sigma_p^2$ is the laser phase noise variance.

8. The receiver of claim 7, wherein the step size is determined analytically and increases as laser phase noise variance and SNR increase.

9. The receiver of claim 7, further comprising additional derotators arranged in a cascaded fashion and configured to use results from previous derotators to estimate and derotate a current signal.

10. The receiver of claim 7, wherein the step size computing module determines a new step size if the SNR or laser phase error variance change.

11. The receiver of claim 7, wherein the derotator module is further configured to estimate phase error using normalized least-mean square with the determined step size.

12. The receiver of claim 7, wherein the rotation coefficient is determined as $$c(n+1) = c(n) + \frac{\mu}{|x(n)|^2} e(n)x^*(n),$$

where c(n) is the previous coefficient, $\mu$ is the step size, x(n) is the received signal, e(n) is the estimation error defined as the difference between the rotated complex amplitude and the decoded symbol, and x*(n) is the complex conjugate of the received signal.

13. A detection module, comprising:
a rotation coefficient module configured to generate a rotation coefficient based on a step size, the complex conjugate of a received signal, and an error signal that represents the difference between a previous received signal and a previous determined symbol;
a rotator configured to rotate a received signal using the rotation coefficient to produce a rotated signal;
a decision module configured to determine a symbol from the rotated signal;
a combiner configured to find the difference between the rotated signal and the determined symbol, producing an error signal; and
a step size computing module configured to determine a step size based on present conditions that provides a balance between convergence speed and precision,
wherein the stepsize is determined as $$\mu_{opt} = \rho\left(\sqrt{1 + \frac{2}{\rho}} - 1\right),$$

where $\rho = \sigma_p^2/\sigma_n^2$, $\sigma_n^2 = 1/\gamma$, $\gamma$ is the SNR, and $\sigma_p^2$ is the laser phase noise variance.

14. The detection module of claim 13, wherein the step size is determined based on a laser phase noise variance and a signal-to-noise ratio.

15. The detection module of claim 14, wherein the step size is determined analytically and increases as laser phase noise variance and SNR increase.

16. The detection module of claim 13, wherein the op step size computing module determines a new step size if the SNR or laser phase error variance change.

17. The detection module of claim 13, wherein the rotation coefficient is determined as $$c(n+1) = c(n) + \frac{\mu}{|x(n)|^2} e(n) x^*(n),$$

where c(n) is the previous coefficient, μ is the step size, x(n) is the received signal, e(n) is the estimation error defined as the difference between the rotated complex amplitude and the decoded symbol, and x*(n) is the complex conjugate of the received signal.

* * * * *